United States Patent [19]

Stribling

[11] 4,397,187

[45] Aug. 9, 1983

[54] CHAMBER FOR TESING ACOUSTICAL TRANSMISSION LOSS CHARACTERISTICS OF SHEET MATERIALS

[75] Inventor: John L. Stribling, Westland, Mich.

[73] Assignee: Ford Motor Company, Dearborn, Mich.

[21] Appl. No.: 293,550

[22] Filed: Aug. 17, 1981

[51] Int. Cl.³ .................................................. G01H 15/00
[52] U.S. Cl. ............................................... 73/589; 73/645
[58] Field of Search ............................... 73/571, 589, 645

[56] References Cited

U.S. PATENT DOCUMENTS 2,837,914  10/1958  Caldwell .......................... 73/589 X
3,470,734  10/1969  Agdur et al. ......................... 73/571

FOREIGN PATENT DOCUMENTS 408997  8/1974  U.S.S.R. ............................... 73/589
602988  3/1978  U.S.S.R. ............................... 73/589

OTHER PUBLICATIONS

"A Measuring Technique for Sound Transmission ..." by Shenoda from J. Acoustic Society of India, vol. VIII, No. 4, pp. 15–18.
T. J. Schultz, "Acoustic Wattmeter", Jul. 1956, pp. 693–699; The Journal of Acoustical Society of America, vol. 28, No. 4.
Albert London, "Methods for Determinng Sound Transmission Loss in the Field," May 1941, pp. 419–453; Part of Journal of Research of the Natl. Bureau of Standards, vol. 26.
David I. G. Jones, "Damping Treatments for Noise and Vibration Control", Jul. 1972, pp. 25–31; Sound and Vibration.

*Primary Examiner*—James J. Gill
*Attorney, Agent, or Firm*—Paul K. Godwin, Jr.; Robert D. Sanborn

[57] ABSTRACT

Acoustical transmission loss of sheet materials in the low frequency range is measured by utilizing a cylindrical test chamber containing a speaker directed towards the upper end to which the sheet material is mounted. Pressure gradient microphones are mounted on either side of the sheet material and are connected to electronic circuitry for responsively indicating the transmission loss measurement across said sheet material.

4 Claims, 3 Drawing Figures

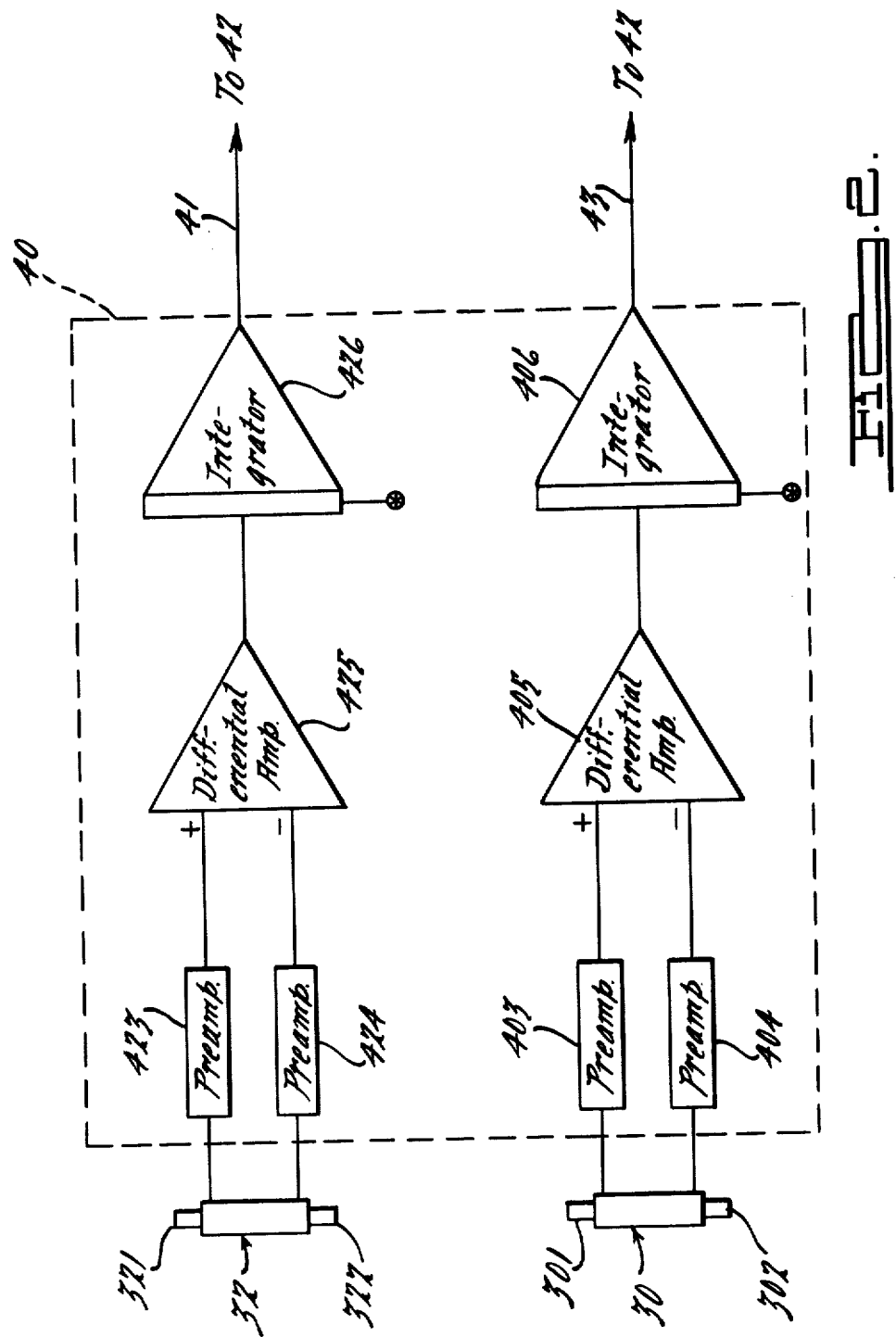

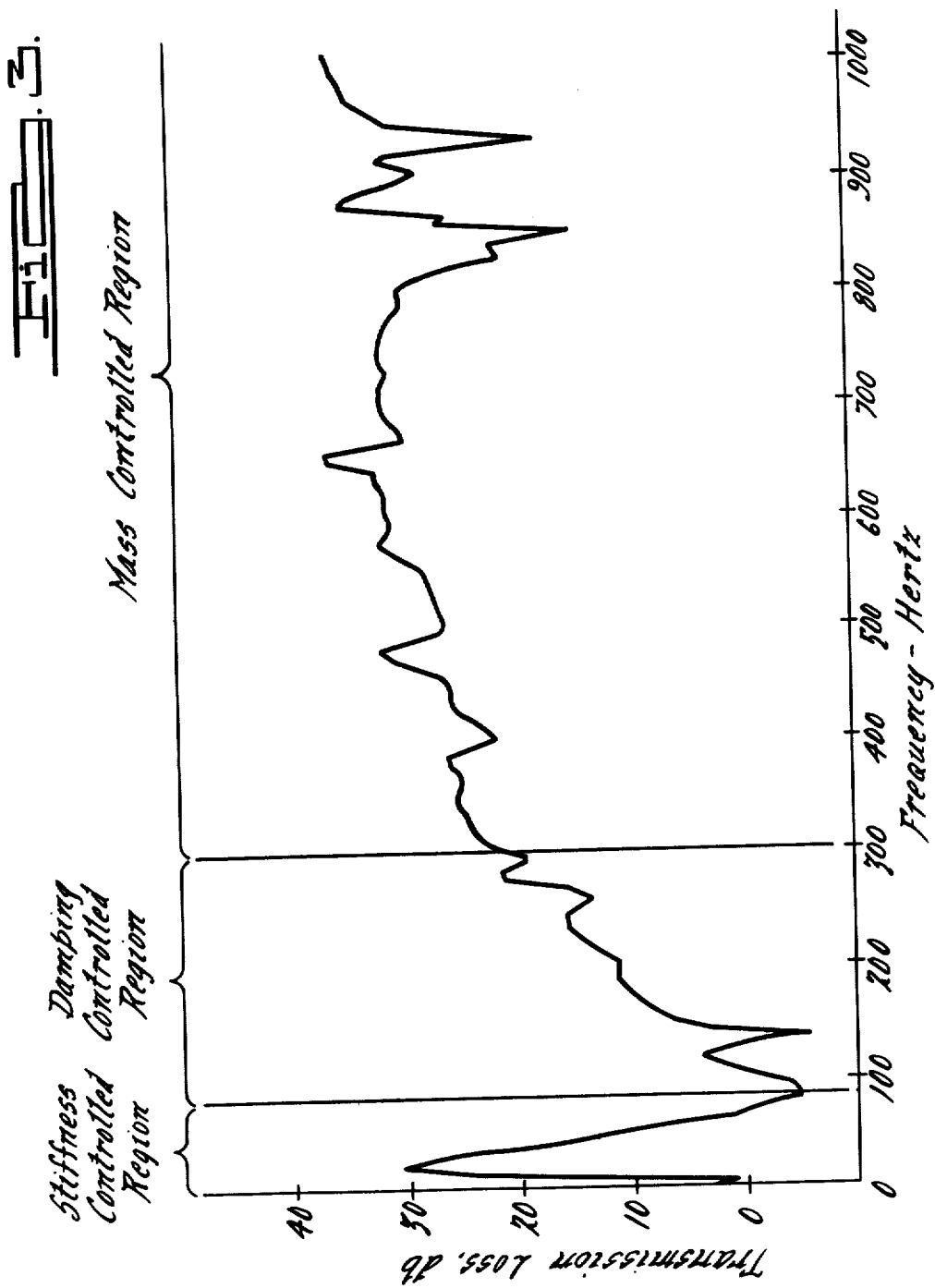

CHAMBER FOR TESING ACOUSTICAL TRANSMISSION LOSS CHARACTERISTICS OF SHEET MATERIALS

BACKGROUND OF THE INVENTION

1. Field of the Invention

The present invention is directed to the field of acoustical testing and more specifically to the area of measuring the transmission loss characteristics for various sheet materials.

2. Description of the Prior Art

Several attempts have been made to provide accurate, reproducible measurements of acoustical transmission losses in structural materials. These measurements are important to those involved in designing such items as buildings, machinery mountings, aircraft, as well as automotive vehicles, since noise isolation is an important factor for insuring longer usable life of the items and human operator and passenger comfort.

An article entitled "Damping Treatments for Noise and Vibration Control" by David I. G. Jones, appeared in *Sound and Vibration* in July 1972 includes a survey of materials and formation techniques that can be utilized to control noise transmission and vibration induced failures in structures. A representative plot of Transmission Loss (TL) vs. Frequency, is shown in FIG. 1, of the article, for a typical structure having transmission loss characteristics classified into three broad regions. In a low range of frequencies, the transmission losses are considered to be mainly "stiffness controlled" while in the intermediate range of frequencies, transmission losses are considered to be "damping controlled" and at higher frequencies, transmission losses are essentially considered to be "mass controlled". It is noted that the three regions are distinct and recognizable in most materials, although the influence of damping extends into the adjacent regions, as well. It is also noted that increasing the stiffness of the material will cause the transmission losses to increase in that material in the stiffness controlled region of frequencies. Similarly, increasing the damping of the material will decrease the resonant vibration amplitude and increase the transmission loss. Increasing the mass of the structure will, as expected, increase the transmission loss in the mass control region but may not have an effect on the vibration amplitude.

It is recognized that the most desirable material, in those installations where a high transmission loss is desired over all frequencies, would be a material which is stiff, heavy and highly damped. On the other hand, in installations such as vehicles and aircraft, weight considerations are quite important and therefore the use of heavy materials is not practical. The Jones article acknowledges that consideration and describes several methods of forming and bracing materials so as to change the response spectra. The Jones article also discusses the use of damping materials and their effects on the response spectra of the structures.

Another article entitled "Method for Determining Sound Transmission Loss in the Field", by Albert London, appeared in the *Journal for Research of the National Bureau of Standards*, vol. 6, May 1941. The London article describes a method of determining the transmission loss of a wall or floor partition by measuring the difference in sound levels existing in two adjacent rooms which have the partition as a separating wall or floor. In one room, a loud speaker unit havig six differently oriented loudspeakers is rotated to give a particular sound pattern that is said to be uniformly distributed throughout the room. Two displaced microphones are positioned an equal distance from the panel surface. On the other side of the panel in the "quiet" room, a similar pair of displaced microphones is positioned. The distance measurement from the surface to the microphone pairs for both the "quiet" and "noisy" rooms are discussed for each of the several measurements made for each of the individual vibration frequencies tested. An alternate method is also described which utilizes a pressure-gradient microphone in place of each pair of conventional microphones.

In terms of automotive acoustical control, the general method employed, to decrease noise levels in the vehicle, is to drive the vehicle on a test track having a known source of road noise and measuring the noise level within the vehicle by use of a sound pressure level meter. When noise levels are considered too high, the transmission point for that noise is attempted to be located and appropriate stiffening or application of carpeting or other composite materials are employed to inhibit the transmission of the noise until a desirable level is reached. Such methods are purely empirical since they are based upon the experience of the test personnel and fail to provide an acoustical standard by which the various materials may be specified to meet.

SUMMARY OF THE INVENTION

It is, therefore, an object of the present invention to provide an acoustical test chamber for measuring the transmission loss characteristics of sheet materials.

It is another object of the present invention to provide an acoustical test chamber that is small enough to use within a room occupied by personnel and other equipment without interference.

If it a further object of the present invention to provide a test chamber for reliable and reproducible acoustical testing for transmission loss characteristics, with a frequency response of approximately 20 to 1000 Hertz.

The aforementioned objects are achieved by the present invention in order to determine information useful in setting standards for the fabrication of particular materials employed for acoustically damping structural materials at selected ranges of frequencies. In particular, the automotive industry is interested in reducing the amount of noise and low frequency vibrations entering the vehicle passenger compartment. Much of the noise and vibrations are road and drivetrain sourced and have been found to occur at the low end of the frequency range, below 300 Hz.

While previous attempts to measure transmission loss characteristics of materials have involved fairly large installations that include anechoic rooms, it was found that the present invention provides results consistent with those of the prior art and, in addition, provides accurate measurements, in the low frequency range, that were not measurable heretofore.

The present invention comprises two cylindrical enclosures coaxially aligned and separated by an upwardly directed speaker having its outer flanged edge clamped between the joined edges of the enclosures. The axes of the enclosures are oriented along the vertical, while the upper enclosure provides the means for mounting the test materials in a generally horizontal orientation. Such mounting orientation is well suited for obtaining accurate test results, since the measurement of acoustical damping effects of materials simulates the lower positioned vibration source for materials that would normally be used for the floor of a vehicle.

Measurements of particle velocities are made on both the chamber side and the external side of the test material, when the speaker is driven. Transmission losses for the test material are derived across a desired spectrum of frequencies by taking the difference in the two measured particle velocities for individual frequencies. A spectrum analyzer is employed to perform this function.

Particle velocity measurements are made by employing two pairs of pressure gradient microphones polarly mounted back-to-back along a line generally perpendicular to the test material. The signals from each pair of microphones are amplified and a differential signal is derived. Each differential signal is integrated. The integrated signals are then fed to the spectrum analyzer where they are processed, as discussed above.

Accordingly, various materials may be tested to determine their suitability for damping transmission of selected frequencies in a reliable, inexpensive and expedient manner. In addition, once the characteristics of a particular material are known, the invention may be used to insure the consistencies of the transmission loss characteristics, during production of that material. The invention can also be used to calibrate new microphone designs and replacements based upon a known material transmission loss characteristic profile.

BRIEF DESCRIPTION OF THE DRAWINGS

FIG. 2 is an electrical block diagram of the amplifier and integrator circuit 40, shown in FIG. 1.

FIG. 3 is a Transmission Loss vs. Frequency plot reflecting measurements made with the present invention for a sheet of 20 gage steel.

DESCRIPTION OF THE PREFERRED EMBODIMENT

Figure 1:
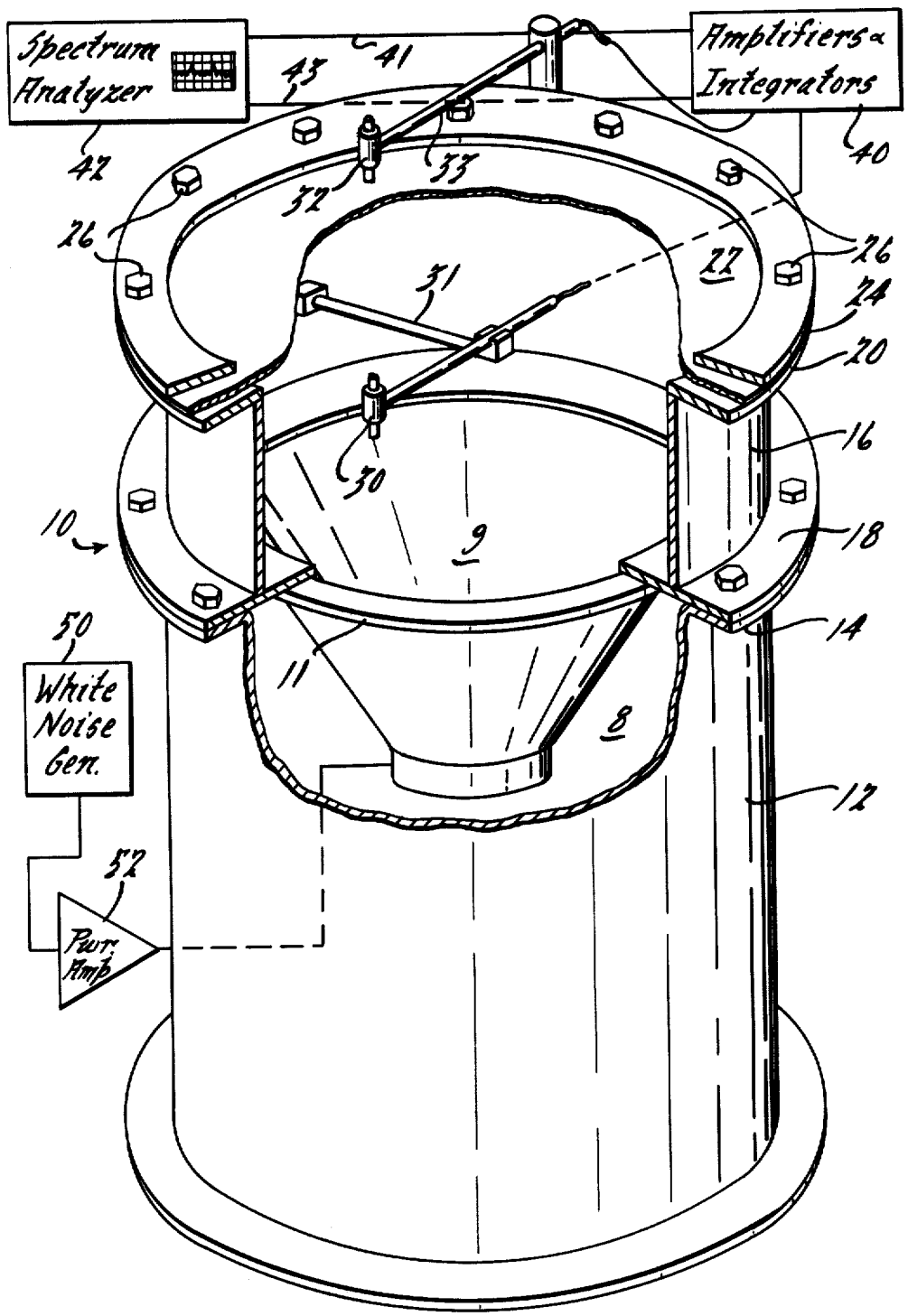
FIG. 1 is an overall view of the apparatus used in the present invention.

The preferred embodiment of the present invention is shown in FIG. 1 as the chamber 10 for testing acoustical transmission loss characteristics of sheet materials. The test chamber 10 includes a first cylindrical enclosure 12 having a diameter of approximately 50 cm. and defining an internal air space 8. The size of the enclosure diameter was selected to approximately correspond to the greatest area of unsupported sheet metal that would be found on vehicles for which the materials are proposed to be used. An upper enclosure 16 is provided having approximately the same diameter as the lower enclosure 12 and mounted on the upper end thereof so as to be coaxial therewith. An upper flange 14 is defined on the upper end of the enclosure 12 to provide support for the upper enclosure 16. The upper enclosure 16 has a mounting flange 18 defined thereon for attachment to the flange 14 of the lower enclosure 12. Bolts or other suitable fastening devices may be used to secure the upper enclosure 16 to the lower enclosure 12. A large heavy duty speaker 9 is mounted at the junction between the upper and lower enclosures so as to direct sound waves upward. The speaker 9 also functions to separate the internal air spaces of the respective enclosures. The speaker 9 contains an outer flange 11 which is attached to the lower flange 18 of the upper enclosure 16. The upper end of the upper enclosure 16 contains a flange 20 which provides a mounting means for materials that are to be tested. Metal sheets material 22 is shown as mounted on the upper flange 20 and is secured thereto by a ring collar 24 that compresses the outer edge of the metal sheet material 22 against the flange 20 by fastening means, such as bolts 26. The metal sheet material 22 then functions as a diaphragm separating the internal air space of enclosure 16 from the external environment.

The speaker 9 is electrically connected to a power amplifier 52 and is driven over a predetermined range of frequencies determined by a "white noise" generator 50, which is electrically connected to the power amplifier 52.

Transmission loss determination across the sheet material 22 is achieved by measuring the difference in the particle velocities above and below the tested material, while that material is being vibrated by the sound waves emanating from the speaker 9. A pressure gradient microphone 30 is mounted on a support brace 31 within the enclosure 16 and above the speaker 9 in a position adjacent to the underside of the test material. The pressure gradient microphone 30 consists of a pair of condenser microphones mounted back to back along a line generally parallel to the central axis of the chamber 10. A second pressure gradient microphone 32 is mounted on a support bracket 33 external to the chamber 10 and above the sheet material 22 in appropriate alignment with the microphone 30. The pressure gradient microphone 32 also consists of a pair of condenser microphones mounted in a back to back arrangement along a line generally parallel to the central axis of the chamber 10. The microphones 30 and 32 are electrically connected to an amplifier and integrator circuit 40, where the signals are processed, and output signals are generated on lines 43 and 41, which represent the respective particle velocity measurements taken by the microphones. The particle velocity signals are fed to a spectrum analyzer 42 where they are compared to determine transmission loss measurements across a spectrum of frequencies. The information produced by the spectrum analyzer is displayed for instantaneous information and may be reproduced in hard copy form by appropriate photographic or other recordation equipment.

In FIG. 2, the amplifier and integrator circuit 40 is detailed to illustrate the derivation of the particle velocity signals which appear on lines 43 and 41 from the respective pressure gradient microphones 30 and 32.

The pressure gradient microphone 30 consists of a condenser microphone 301 and a like condenser microphone 302. The condenser microphones are respectively connected to preamplifiers 403 and 404. The outputs from the preamplifiers 403 and 404 are fed to the input terminals of a differential amplifier 405, that outputs a signal which corresponds to a measurement of particle acceleration, as detected by the back-to-back mounted condenser microphones 301 and 302. An integrator 406 receives the signal from the differential amplifier 405 and produces an output signal on line 43 which corresponds to the particle velocity of the sound waves detected by the microphones 301 and 302.

In an identical manner, the pressure gradient microphone 32, which is mounted external to the chamber 10, contains a pair of back-to-back mounted condenser microphones 321 and 322 respectively connected to preamplifiers 423 and 424. A differential amplifier 425 receives the output from the preamplifiers 423 and 424 to generate a signal indicative of particle acceleration as detected by the microphones. An integrator circuit 426 receives the output of the differential amplifier 425 and produces an output signal on line 41 which corresponds to the measurement of particle velocity of the sound waves that pass the pair of condenser microphones 321 and 322.

Transmission loss is then calculated as the difference between the two measured particle velocities at the particular frequency of transmission.

The plot shown in FIG. 3 is a graphical representation of the transmission loss measurements for frequencies in the range of 0 to 1000 Hz, by the present invention for a sheet of 20 gage steel in the location of sheet material 22, shown in FIG. 1. The various controlled regions that were designated as stiffness, damping and mass controlled in the Jones article, discussed above, are clearly distinguishable in the FIG. 3 plot. In the case of the 20 gage steel, the first resonant frequency of vibration occurs at approximately 75 Hz while other resonant frequencies appear at approximately 135 Hz, 260 Hz, and 290 Hz. By definition, the resonant frequencies appear to occur in the damping controlled region and the average slope of the plot in that range is fairly steep. At 300 Hz., it is seen that the average slope of the plot is dramatically lowered and thereby indicates entry into the mass controlled region above the 300 Hz frequency.

The plot shown in FIG. 3 is found to be approximately the same as theoretical curves previously developed for 20 gage sheet steel. Other tested materials have also been found to correlate and provide confidence in the validity of the results obtained by utilizing the present invention.

The advantage of utilizing the present invention is that the effects of the low range of vibration frequencies, such as 20-100 Hz can be accurately measured, vis-a-vis the transmission loss in the tested material. Prior to the present invention, the stiffness controlled region of materials between 0 Hz and the first (fundamental) resonant frequency, were not perceived to have variations other than a sharp decrease. However, as can be seen in FIG. 3, there is a distinct variation in the transmission loss characteristics of the tested material over the stiffness controlled region that was not heretofore known or measurable.

Of course the advantage of the present invention is that by utilizing the same materials that will be placed in the vehicle, such as 20 gage sheet steel for a floor pan, various composite damping materials, such as mastics, padding and carpeting, may be tested for their damping effects. By placing such materials on top of diaphragm 22 and running the test over a selected range of frequencies, a Transmission Loss vs. Frequency plot is generated for each composite material to determine which material provides the best damping effects for the particular frequencies that are found to be an annoyance in that particular vehicle. In that manner, the verification of materials supplied to the specifications determined, as the result of the initial testing, can be monitored to insure that the acoustical damping properties remain consistent.

While the aforementioned invention is shown as utilized in a chamber which consists of two separate enclosures that are bolted together, it is perceived that others may develop mounting techniques for the speaker which eliminate the need for two separate enclosures so that a single enclosure structure may be utilized with two defined chambers.

It is further seen that many other modifications and variations may be implemented without departing from the scope of the novel concept of this invention. Therefore, it is intended by the appended claims to cover all such modifications and variations which fall within the true spirit and scope of the invention.

I claim:

1. A chamber for testing acoustical transmission loss characteristics of sheet materials comprising:

means defining a first cylindrical enclosure oriented along a vertical axis;

means for producing acoustical vibrations within said housing including a speaker electrically connected to a generator for driving said speaker over a predetermined range of frequencies within at least the frequency range of approximately 20–800 Hz;

means for defining a second cylindrical enclosure oriented along said vertical axis and being separated from said first enclosure defining means by said acoustical means;

means for mounting said sheet material on one end of said second enclosure defining means separated from said acoustical means;

first means for detecting the pressure gradient within said second enclosure defining means;

second means for detecting the pressure gradient above said sheet material mounting means, wherein each of said first and second pressure gradient detecting means comprises a pair of oppositely facing microphones disposed along a line approximately parallel to said vertical axis and separated by a predetermined distance;

means for monitoring said first and second means and for responsively producing an output signal indicative of transmission loss through said mounted sheet material;

wherein said monitoring means is connected to each pair of microphones of each of said first and second pressure gradient detecting means and includes means for differentiating the detection signal from the microphones in each pair and means for outputting a signal indicative of an integration of each differentiated signal.

2. A test chamber as in claim 1, wherein said monitoring means further includes means for receiving each integration signal and comparing those signals to determine said transmission loss.

3. A test chamber as in claim 2, wherein said receiving means includes a spectrum analyzer for indicating said determined transmission losses over said predetermined range of frequencies.

4. A chamber for testing acoustical transmission loss characteristics of sheet materials comprising:

a first enclosure having a generally cylindrical shape along a vertical axis;

a speaker mounted in the upper end of said first cylindrical enclosure;

means for driving said speaker over a predetermined range of frequencies;

a second enclosure having a generally cylindrical shape along a vertical axis and being mounted on said upper end of said first cylindrical enclosure to be coaxial therewith;

means for mounting said sheet material on the upper end of said second cylindrical enclosure; and means for detecting the difference in particle velocity above and below said sheet material when said speaker is driven.

* * * * *